R. HAMILTON.
Seed-Planter.
No. 19,633.
Patented Mar. 16, 1858.
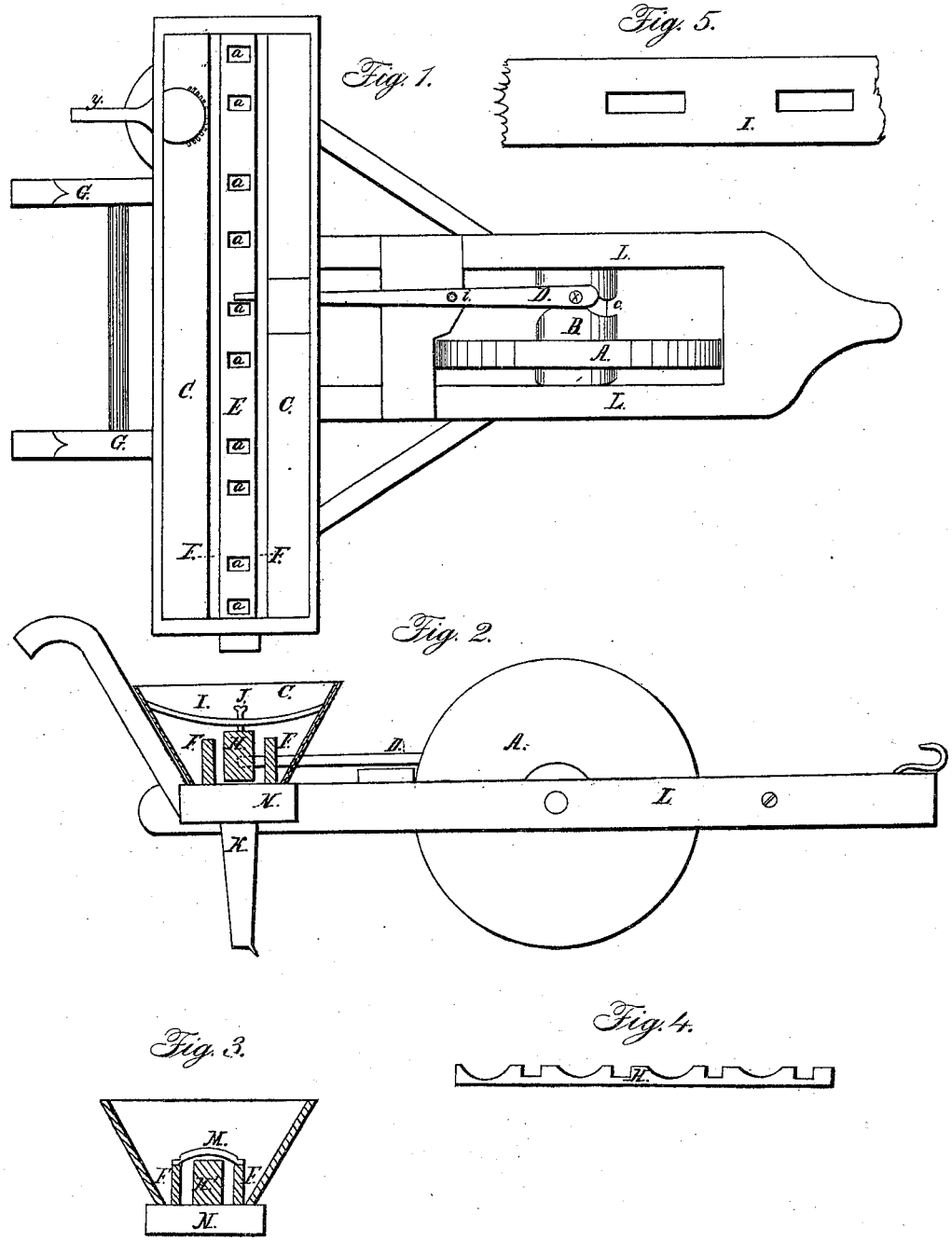

UNITED STATES PATENT OFFICE.

ROBERT HAMILTON, OF FRANKLIN, INDIANA.

IMPROVEMENT IN SEED-DRILLS.

Specification forming part of Letters Patent No. 19,633, dated March 16, 1858.

*To all whom it may concern:*

Be it known that I, ROBERT HAMILTON, of Franklin, Johnson county, Indiana, have invented certain new and useful Improvements in Seeding-Machines; and I do hereby declare that the following is a full, clear, and exact description of the same, reference being had to the accompanying drawings, and to the letters of reference marked thereon.

The nature of my invention consists in the peculiar arrangement of devices hereinafter described, for the purpose of sowing different kinds of grain, as will be fully set forth.

In order that others skilled in the art may construct and use my invention, I will proceed to describe its construction and operation.

In the accompanying drawings, which form a part of this specification, Figure 1 is a plan view. Fig. 2 is a side elevation. Fig. 3 is an end view of the seed-box, showing a different arrangement from that seen in Fig. 2, for the purpose of sowing other kinds of grain. Fig. 4 is a view of the seeding vibrating bar, showing its construction. Fig. 5 shows a portion of the bottom I. (Seen in Fig. 2.)

In Fig. 1 A is the driving-wheel of the machine. B is the axle on which this wheel revolves, said axle having a cam-groove around it, which is represented by c. D is a bar or lever, which is secured and works on a fulcrum at i, said lever having a plug, x, in one extremity, which plug works in the cam-groove c in the axle, and thus gives the lever D motion. The other end of lever D, entering the seed-box, serves to vibrate the bar H, as seen in Fig. 2. C represents the seed-box. E is a slide-bar in the bottom of the seed-box, for the purpose of regulating the discharge of seed. *a a* are apertures in the slide E, for the purpose of allowing the seed to pass through to the seed-spout. F F represent the sides of the chamber in which the bar H operates. G G are the handles of the machine, and L L represent the frame. Y regulates the slide E.

In Fig. 2 L is the frame. A is the driving-wheel. D is the lever for operating the seed-bar. H is the vibrating seeding-bar. F F are the sides of the chamber in which this bar operates. I is a circular bottom, which is placed over the seed-chamber C. This bottom is seen in Fig. 5, having apertures cut in it and marked *o*. J is a screw or stirrer, which is secured to the bar H. There may be any desired number of these stirrers, and they pass through the bottom I and operate laterally in the slots *o* of said bottom. N is the bottom of the seed-box; G, the handle of the machine, and K the discharge-spout.

Fig. 3 represents the seed-box, the chamber in which the vibrating bar H works being covered with top marked M.

Fig. 4 represents the shape and construction of the seeding-bar H.

In the operation of this invention it will be seen, from Fig. 2, that the seed is placed in the chamber C on top of the circular bottom I. This arrangement of the machine is for sowing oats and barley, and such rough grain as will not run through ordinary seeding-machines. The machine being set in motion, the lever D being operated upon by the cam on the axle, in turn operates the bar H in the seed-chamber and causes it to have a quickly-vibrating lateral motion. The screws or stirrers J, operating in the slots in the bottom I, work the seed down through these slots and on each side of the bar H. It thus works under bar H and out at the apertures in the bottom of the seed-box, into the discharge-spout, and thence to the ground.

It will be seen by referring to Fig. 1 that there are two apertures in the bottom of the seed-box to each one of the discharge-spouts, and through these apertures the vibrating bar H shoves the seed as it moves each way, there being a continual discharge of seed in this manner through the discharge-spout. As the bar is moving in one direction the seed runs out of one of the apertures, and as soon as the bar moves in the other direction the seed pours out of the other aperture. Thus there is a continuous stream. Stirring the rough seed through the bottom I, causing it to descend by means of the vibrating bar H, and causing it to pour through two apertures in the bottom of the seed-box by means of the peculiarly-shaped bar H, in this manner I produce a better effect in planting this kind of seed than has ever been produced before.

In planting or sowing smooth grain I remove the bottom I and place in the chamber in which bar H operates another bar. (Seen in Fig. 3,) which has no stirrers attached to it, and then secure on the top M. (Seen in Fig. 3.)

The seed then passes on each side of the sides F F, and through these sides under the bar H, and thence out into the discharge-spout. Thus, by changing the cap M and the bottom I, this machine may be made either a seeder for rough seed or smooth seed, as is desired.

Having thus fully described my invention, I claim—

The peculiar arrangement of the circular bottom I, as prepared, with the vibrating bar H, pins J, sides F F, lever D, slide E, and cam c, all operated and constructed in the manner herein set forth, and for the purpose described.

ROBERT HAMILTON.

Witnesses:
C. M. ALEXANDER,
JNO. G. MILLER.